(12) United States Patent
Odaira et al.

(10) Patent No.: US 9,638,937 B2
(45) Date of Patent: May 2, 2017

(54) SPECTACLE LENS, AND METHOD FOR DESIGNING SPECTACLE LENS, MANUFACTURING METHOD AND MANUFACTURING SYSTEM OF THE SPECTACLE LENS

(71) Applicant: HOYA CORPORATION, Tokyo (JP)

(72) Inventors: Tomohiro Odaira, Tokyo (JP); Kazuma Kozu, Tokyo (JP)

(73) Assignee: HOYA CORPORATION, Tokyo (JP)

( * ) Notice: Subject to any disclaimer, the term of this patent is extended or adjusted under 35 U.S.C. 154(b) by 19 days.

(21) Appl. No.: 14/387,406

(22) PCT Filed: Mar. 15, 2013

(86) PCT No.: PCT/JP2013/057439
§ 371 (c)(1),
(2) Date: Sep. 23, 2014

(87) PCT Pub. No.: WO2013/141160
PCT Pub. Date: Sep. 26, 2013

(65) Prior Publication Data
US 2015/0049302 A1 Feb. 19, 2015

(30) Foreign Application Priority Data
Mar. 23, 2012 (JP) ................................ 2012-067700

(51) Int. Cl.
*G02C 7/06* (2006.01)
*G02C 7/02* (2006.01)
*G06Q 30/06* (2012.01)

(52) U.S. Cl.
CPC ............. *G02C 7/065* (2013.01); *G02C 7/027* (2013.01); *G02C 7/028* (2013.01); *G06Q 30/0621* (2013.01)

(58) Field of Classification Search
CPC . G02C 7/00; G02C 7/02; G02C 7/022; G02C 7/024–7/028; G02C 7/06–7/068
(Continued)

(56) References Cited

U.S. PATENT DOCUMENTS 5,506,630 A     4/1996  Ueno et al.
6,106,118 A *   8/2000  Menezes ................ G02C 7/061
                                                351/159.42

(Continued)

FOREIGN PATENT DOCUMENTS

CN      1980771 A      6/2007
EP      2 045 649 A1   4/2009
(Continued)

OTHER PUBLICATIONS

Jun. 18, 2013 International Search Report issued in International Application No. PCT/JP2013/057439.
(Continued)

*Primary Examiner* — Ricky Mack
*Assistant Examiner* — Robert E Tallman
(74) *Attorney, Agent, or Firm* — Oliff PLC

(57) ABSTRACT

There is provided a spectacle lens, including: specific first and second reference points, and eye point between the first and second reference points on a meridian, with each point defined on a meridian; and a power variation portion where power is continuously varied from the first reference point to the second reference point, wherein a variation rate of an addition power is substantially zero in a circle of radius 4 mm with the first reference point as a center, and/or in a circle of radius 4 mm with the eye point as a center.

12 Claims, 7 Drawing Sheets

(58) Field of Classification Search
USPC ....... 351/41, 159.01, 159.41, 159.42, 159.47
See application file for complete search history.

(56) References Cited

U.S. PATENT DOCUMENTS

| | | | | |
|---|---|---|---|---|
| 6,123,422 | A * | 9/2000 | Menezes | .......... B29D 11/00028 264/1.8 |
| 6,220,705 | B1 | 4/2001 | Francois et al. | |
| 6,231,184 | B1 * | 5/2001 | Menezes | ................ G02C 7/061 351/159.42 |
| 2006/0262270 | A1 | 11/2006 | Bourdoncle et al. | |
| 2008/0051012 | A1 | 2/2008 | Akiyama et al. | |
| 2009/0326693 | A1 | 12/2009 | Yanari | |
| 2010/0026954 | A1 * | 2/2010 | Kozu | .................... G02C 7/068 351/159.42 |
| 2010/0110373 | A1 | 5/2010 | Drobe et al. | |
| 2011/0001925 | A1 | 1/2011 | Drobe et al. | |
| 2011/0222019 | A1 * | 9/2011 | Suzuki | .................. G02C 7/024 351/159.42 |
| 2012/0008089 | A1 * | 1/2012 | Kozu | ...................... G02C 7/02 351/159.46 |
| 2012/0062837 | A1 | 3/2012 | Wada et al. | |
| 2013/0100398 | A1 * | 4/2013 | Ryndin | .................. G02C 7/024 351/159.42 |

FOREIGN PATENT DOCUMENTS

| | | | | |
|---|---|---|---|---|
| FR | 2 894 687 | A1 | 6/2007 | |
| FR | 2 928 745 | A1 | 9/2009 | |
| IL | WO 2012004783 | A2 * | 1/2012 | ............ G02C 7/024 |
| JP | A-06-337381 | | 6/1994 | |
| JP | A-2000-214419 | | 8/2000 | |
| JP | A-2008-535031 | | 8/2008 | |
| JP | A-2011-059541 | | 3/2011 | |
| WO | WO 2008/010504 | A1 | 1/2008 | |
| WO | 2011098952 | A1 | 8/2011 | |

OTHER PUBLICATIONS

International Preliminary Report on Patentability issued in International Patent Application No. PCT/JP2013/057439 dated Oct. 23, 2014.

Nov. 2, 2015 Extended European Search Report issued in Patent Application No. 13764762.4.

* cited by examiner

SPECTACLE LENS, AND METHOD FOR DESIGNING SPECTACLE LENS, MANUFACTURING METHOD AND MANUFACTURING SYSTEM OF THE SPECTACLE LENS

TECHNICAL FIELD

The present invention relates to a spectacle lens having a region in which a refractive power (called simply power hereafter) is continuously varied, and a method for designing such a spectacle lens, and a manufacturing method and a manufacturing system of the spectacle lens.

DESCRIPTION OF RELATED ART

In designing a spectacle lens having a region in which a power is continuously varied, a meridian (principal sight line) formed on the assumption of a motion of a visual line from a distance vision to a near vision, is defined on a lens, and a clear vision region is set, with less distortion, blurring, and sway of an image, using the defined meridian as a reference. A specific structure of a spectacle lens thus designed, is described in patent documents 1 to 3 for example.

In a spectacle lens of patent documents 1 to 3, each point of a distance reference point, an eye point (distance fitting point), and a near power measurement point, is defined on the meridian. The distance reference point is a reference point of measuring a distance portion based on JIS specification, and the near reference point is a reference point of measuring near portion based on JIS specification. An intermediate corridor is disposed between the distance reference point and the near reference point, in which power on the meridian is progressively varied according to an addition. The addition described here means the power added to a distance power (distance diopter) at the distance reference point. Therefore, the addition in the intermediate corridor of the spectacle lens (called a "progressive addition lens" hereafter) having a region in which power is continuously varied, becomes larger as the power is larger toward the near reference point from the distance reference point.

PRIOR ART DOCUMENT

Patent Document

Patent document 1: Japanese Patent Laid Open Publication No. 2011-59541
Patent document 2: Japanese Patent Laid Open Publication No. 2000-214419
Patent document 3: Japanese Patent Laid Open Publication No. 1994-337381

SUMMARY OF THE INVENTION

Problem to be Solved by the Invention

Incidentally, in the spectacle lens of patent documents 1 to 3, the eye point is disposed in a region between the distance reference point and the near reference point, namely in the intermediate corridor. Further, the eye point is defined as a point where a visual line is passed in a case of a distance vision of a wearer in an as-worn state. In a conventional spectacle lens, the addition is continuously increased toward the near reference point from the distance reference point. Therefore, the eye point is the point where plus power is added to the distance power.

Conventionally, as described above, although it is a publicly-known matter that plus power is added at the eye point, such a matter itself is not particularly recognized as a subject by a skilled person (a technician who performs optical design of a spectacle lens). The following situation is taken into consideration as the reason.

(1) Owing to the improvement of a manufacturing technique of a spectacle lens, a distance power at the distance reference point can be created just as prescribed and an absolute error of the distance power becomes small.

(2) Power difference between the power at the distance reference point and the eye point falls within a range of approximately 0.15 D (diopter) when a prescribed addition is 3 D in terms of an optical design of the spectacle lens, and it can be considered that such a degree of error has no great influence on a distance vision.

(3) Even if a spectacle is slipped down in as-worn state, a spectacle wearer uses the spectacle in such a slip-down state, thereby suppressing an influence of addition of a plus power. Supplementary description is given as follows. When the spectacle is slipped down, a visual line of the wearer in a distance vision is displaced upward from the eye point on the meridian. At this time, a direction in which the visual line of the distance vision is displaced, is the direction in which the addition of the plus power is small. Therefore, the wearer hardly feels the influence of the addition of the plus power, and therefore such an influence is substantially small.

In view of such a circumstance, an applicant of the present application individually examines a ratio of receiving claims from purchasers of the spectacle and contents of the claims, with a cooperation of a spectacle shop (dealer). Then, although the ratio of the claims is small because it is about 1 to 2% of an entire sales numbers of the spectacle, when the contents of the claims are examined, it is found that the claims arise from the addition of the plus power at the eye point of the progressive addition lens, although this is an extremely minority group.

Therefore, when inventors of the present invention further specifically examine the contents of the claims, it is found that the claims are received from a user suffering from easy slip-up of the spectacle in as-worn state, the claims being as follows: an image is blurred in a case of a distance vision through the progressive addition lens. As one of the factors, it can be considered that when the spectacle is slipped-up in as-worn state, the visual line of the wearer in the distance vision is displaced downward from the eye point (in a direction in which the addition of the plus power is increased). However, the user whose spectacle is slipped-up in as-worn state, belongs to a minority group in all wearers, and a view of the distance vision is improved in many cases by fitting adjustment by a spectacle shop where the claims are actually received.

Under such a circumstance, conventionally, the fact that "there is a problem that addition of the plus power at the eye point has a considerable influence on the view of the distance vision", is not recognized as a subject.

Therefore, it is found by the inventors of the present invention as a new subject, that even in a case of the spectacle lens satisfying the power just as prescribed at each point of the distance reference point and the near power measurement point, there is a problem that a long distance based on a prescription value cannot be clearly viewed when this spectacle lens is settled in a frame. The present invention is thus achieved.

In view of the above-described circumstance, the present invention is provided, and an object of the present invention is to provide a spectacle lens capable of allowing a wearer to clearly view the long distance, etc., based on the prescription value, in the case of the distance vision, etc., of the wearer in as-worn state, a method for designing such a spectacle lens, a manufacturing method and the manufacturing system of such a spectacle lens.

Means for Solving the Problem

According to an aspect of the present invention, there is provided a spectacle lens, including:

specific first and second reference points, and eye point between the first and second reference points on a meridian, with each point defined on a meridian; and a power variation portion where power is continuously varied from the first reference point to the second reference point, wherein a variation rate of an addition power is substantially zero in a circle of radius 4 mm with the first reference point as a center, and/or in a circle of radius 4 mm with the eye point as a center.

According to an aspect of the present invention, there is substantially no addition of power in the circle of radius 4 mm with the first reference point as a center, and/or in the circle of radius 4 mm with the eye point as a center. Therefore, a wearer can clearly view a distance just as prescribed through the eye point (or near the eye point). Further, even in a case of moving the visual line in this circle area, the wearer can clearly view the distance just as prescribed without feeling the blurring, etc., of the image.

Further, in the spectacle lens according to an aspect, the variation rate of an addition power is also substantially zero in a section on a meridian from the first reference point to an edge of the spectacle lens at an opposite side of the eye point.

Further, in the spectacle lens according to an aspect, the spectacle lens is configured to satisfy a distance power at the first reference point based on specific prescription information, and satisfy a near power at the second reference point based on the prescription information, and the eye point is a point for distance vision, and the spectacle lens is a progressive addition lens so that power is progressively varied in the power variation portion.

Further, in the spectacle lens according to an aspect, for example a maximum addition point on an addition curve showing a variation of addition on the meridian, is set at a point deviated from the second reference point by at least 5 mm to an opposite side of the eye point, and the maximum addition is set to at least 1.10 times of the addition at the second reference point, to thereby obtain a low-gradient inclination of the addition curve in the section from the eye point to the second reference point.

Further, according to an aspect of the present invention, there is provided a method for designing a spectacle lens including specific first and second reference points, and eye point between the first and second reference points on a meridian, with each point defined on a meridian; and a power variation portion where a power is continuously varied from the first reference point to the second reference point, the method including: setting a power distribution of the power variation portion so that a variation rate of an addition power is substantially zero in a circle of radius 4 mm with the first reference point as a center, and/or in a circle of radius 4 mm with the eye point as a center.

Further, in the method for designing a spectacle lens according to an aspect of the present invention, the power distribution on the meridian may be set so that the variation rate of an addition power is also substantially zero in a section on a meridian from the first reference point to an edge of the spectacle lens at an opposite side of the eye point.

Further, there is provided the method for designing a spectacle lens according to an aspect of the present invention, including:

setting the power distribution in the power variation portion by arranging a plurality of control points on the meridian, calculating a power at each control point based on a power difference between the first and second reference points; and interpolating a power between adjacent control points using an interpolation function, wherein an addition power is set to be substantially zero at all control points in this section.

Further, there is provided a method for manufacturing a spectacle lens according to an aspect of the present invention, including manufacturing a spectacle lens designed using the method for designing a spectacle lens.

Further, according to an aspect of the present invention, there is provided a manufacturing system of a spectacle lens including specific first and second reference points, and eye point between the first and second reference points, with each point defined on a meridian; and a power variation portion where a power is continuously varied from the first reference point to the second reference point, the system including:

an ordering side terminal configured to transmit specific prescription information as ordering data;

a design side terminal configured to receive the ordering data and design a spectacle lens suitable for a prescription; and a processing device configured to polish a spectacle lens surface according to a design at the design side terminal, wherein the design side terminal is configured to set a power distribution of the power variation portion so that a variation rate of an addition power is substantially zero in a circle of radius 4 mm with the first reference point as a center, and/or in a circle of radius 4 mm with the eye point as a center.

Further, the spectacle lens according to an aspect of the present invention includes specific first and second reference points, and eye point between the first and second reference points, with each point defined on a meridian; and a power variation portion where a power is continuously varied from the first reference point to the second reference point, wherein a maximum addition power difference is suppressed to 0.03 D or less in a circle of radius 4 mm with the first reference point as a center, and/or an addition power difference is suppressed to 0.06 D or less in a circle of radius 4 mm with the eye point as a center.

Advantage of the Invention

According to an aspect of the present invention, there is provided a spectacle lens capable of allowing a wearer to clearly view a long distance, etc., based on a prescription value, in a case of a distance vision, etc., of the wearer in as-worn state, a method for designing a spectacle lens, a manufacturing method and the manufacturing system of the spectacle lens.

DETAILED DESCRIPTION OF THE INVENTION

Explanation is given for a manufacturing system of a spectacle lens for designing and manufacturing a spectacle lens using a method for designing a spectacle lens according to an embodiment of the present invention.

[Spectacle Lens Manufacturing System 1]

Figure 1:
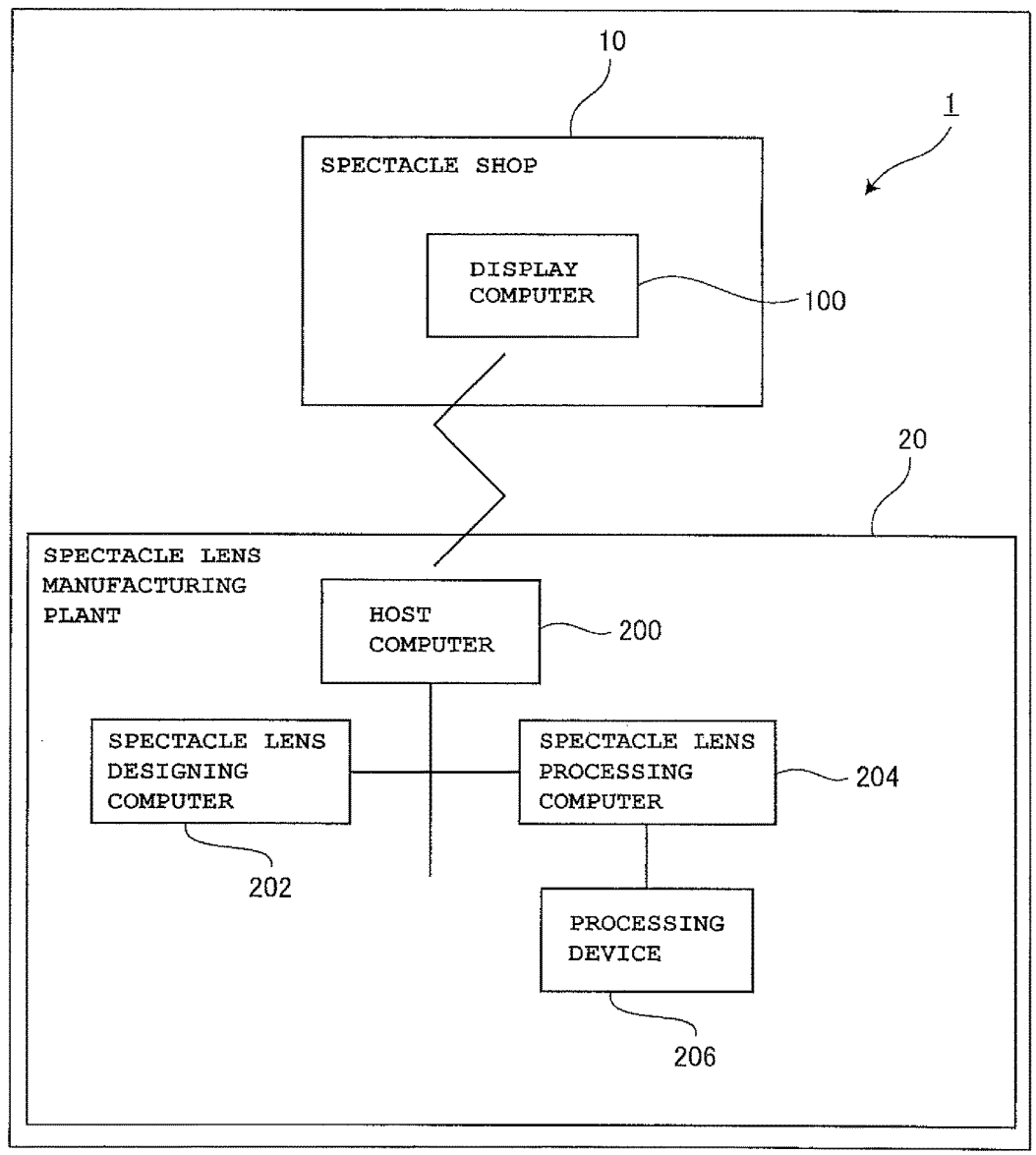
FIG. 1 is a block diagram showing a structure of a manufacturing system of a spectacle lens for realizing a method for manufacturing a spectacle lens according to an embodiment of the present invention.

FIG. 1 is a block diagram showing a structure of a manufacturing system of a spectacle lens for realizing a method for manufacturing a spectacle lens according to an embodiment of the present invention. As shown in FIG. 1, the spectacle lens manufacturing system 1 has a spectacle shop 10 for ordering a spectacle lens based on a prescription for a client (expected to be a wearer), and a spectacle lens manufacturing plant 20 for manufacturing a spectacle lens under reception of an order from the spectacle shop 10. Order to the spectacle lens manufacturing plant 20 is performed through data transmission by a specific network such as Internet and FAX, etc. An ophthalmologist and a general consumer may be included in an orderer.

[Spectacle Shop 10]

A display computer 100 is installed in the spectacle shop 10. The display computer 100 is a general PC (Personal Computer) for example, and software is installed on the display computer 100 for giving an order of a spectacle lens to the spectacle lens manufacturing plant 20. Lens data and frame data are inputted in the display computer 100 through an operation of a mouse and a keyboard, etc., by spectacle shop stuff. The lens data includes for example, prescription values (base curve, spherical refractive power, astigmatic refractive power, cylinder axis direction, prism refractive power, prism base direction, addition power, pupillary distance, near PD, etc.), wearing conditions of a spectacle lens (inter-vertex distance, pantoscopic angle, frame tilt angle), the type of a spectacle lens (single focal spherical, single focal aspherical, multifocal (bifocal, progressive), coating (dyeing, hard coat, antireflective film, UV-cut, etc.)), and layout data according to a request of a client. The frame data includes shape data of a frame selected by a client. The frame data is managed by a barcode tag for example, and can be available through reading the barcode tag attached to a frame, by a barcode reader. The display computer 100 transmits ordering data (lens data and frame data) to the spectacle lens manufacturing plant 20 through Internet for example.

[Spectacle Lens Manufacturing Plant 20]

LAN (Local Area Network) with a host computer 200 as a center, is constructed in the spectacle lens manufacturing plant 20, connected thereto are a plurality of terminal devices such as a spectacle lens designing computer 202 and a spectacle lens processing computer 204. The spectacle lens designing computer 202 and the spectacle lens processing computer 204, are general PCs, and a program for designing a spectacle lens and a program for processing a spectacle lens are installed thereon respectively. Ordering data transmitted from the display computer 100 through Internet, is inputted in the host computer 200. The host computer 200 transmits the inputted ordering data to the spectacle lens designing computer 202.

In the spectacle lens manufacturing plant 20, after the ordering data is received, designing and processing of both surfaces of a convex surface (object side) and a concave surface (eyeball side), are applied to an unprocessed block piece, so as to satisfy a prescription of an expected wearer. Note that in the spectacle lens manufacturing plant 20, in order to improve productivity, powers in all fabrication range are divided into a plurality of groups, and a semi-finished blank having a convex curve shape (spherical shape or aspherical shape) and a lens diameter matching a power range of each group, may be previously prepared in preparation for the order of the spectacle lens. In this case, in the spectacle lens manufacturing plant 20, a spectacle lens based on the prescription of the expected wearer, can be manufactured only by performing the concave-surface side processing (and edging).

The spectacle lens designing computer 202 has a program installed thereon for designing a spectacle lens according to order or order reception, and is configured to prepare lens design data based on the ordering data (lens data), and prepare edging data based on the ordering data (frame data). Designing of the spectacle lens by the spectacle lens designing computer 202, will be descried later in detail. The spectacle lens designing computer 202 transmits the prepared lens design data and edging data to the spectacle lens processing computer 204.

An operator sets the block piece in a processing device 206 such as a curve generator, etc., and inputs an instruction of starting the processing to the spectacle lens processing computer 204. The spectacle lens processing computer 204 reads the lens design data and the edging data transmitted from the spectacle lens designing computer 202, and controls to drive the processing device 206. The processing device 206 grinds/polish both surfaces of the block piece based on the lens design data, to thereby create a convex shape and a concave shape of the spectacle lens. Further, the processing device 206 processes an outer peripheral surface of an uncut lens after creating the convex shape and the concave shape into a circumference shape corresponding to a lens shape.

Each kind of coating such as dyeing, hard coat, antireflection film, and UV-cut, etc., is applied to the spectacle lens after edging. Thus, the spectacle lens is completed and delivered to the spectacle shop 10.

[Specific Method for Designing a Spectacle Lens by the Spectacle Lens Designing Computer 202]

Figure 2:
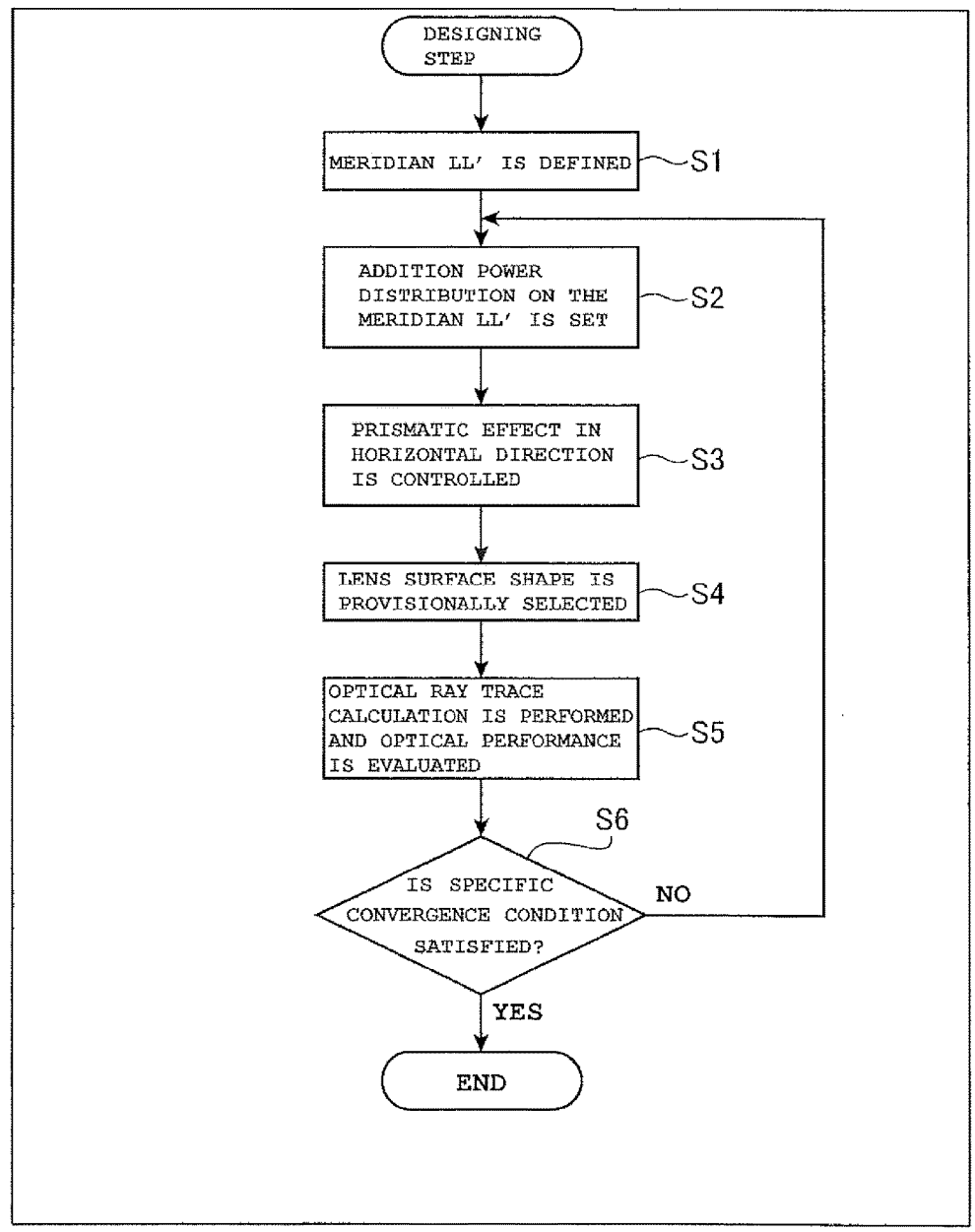
FIG. 2 is a flowchart showing designing steps of the spectacle lens by a computer for designing a spectacle lens according to an embodiment of the present invention.

FIG. 2 is a flowchart showing the steps of designing a spectacle lens by the spectacle lens designing computer 202. A processing step is abbreviated as "S" in the description of this specification and in the figure, for the convenience of explanation. Explanation is given hereafter, for a design example on the assumption of one-side aspherical type having a progressive refractive element on a convex surface or a concave surface, or both-sides progressive type having the progressive refractive element on the convex surface and the concave surface, or both sides complex type progressive addition lens having a vertical progressive refractive element distributed to the convex surface, and a horizontal progressive refractive element distributed to the concave surface. However, the present invention can also be applied to each kind of other progressive addition lens such as a one-side ashperical type, both-sides progressive type, both-sides complex type progressive addition lens for near/intermediate bifocals. Further, the above design step can also be applied to a design based on a concept of satisfying a prescription value by a transmission mean power distribution distributed to both surfaces (convex surface and concave surface), or a design based on a concept of satisfying a prescription value of distribution added with the mean power distribution distributed to each surface (convex surface and concave surface).

Figure 3:
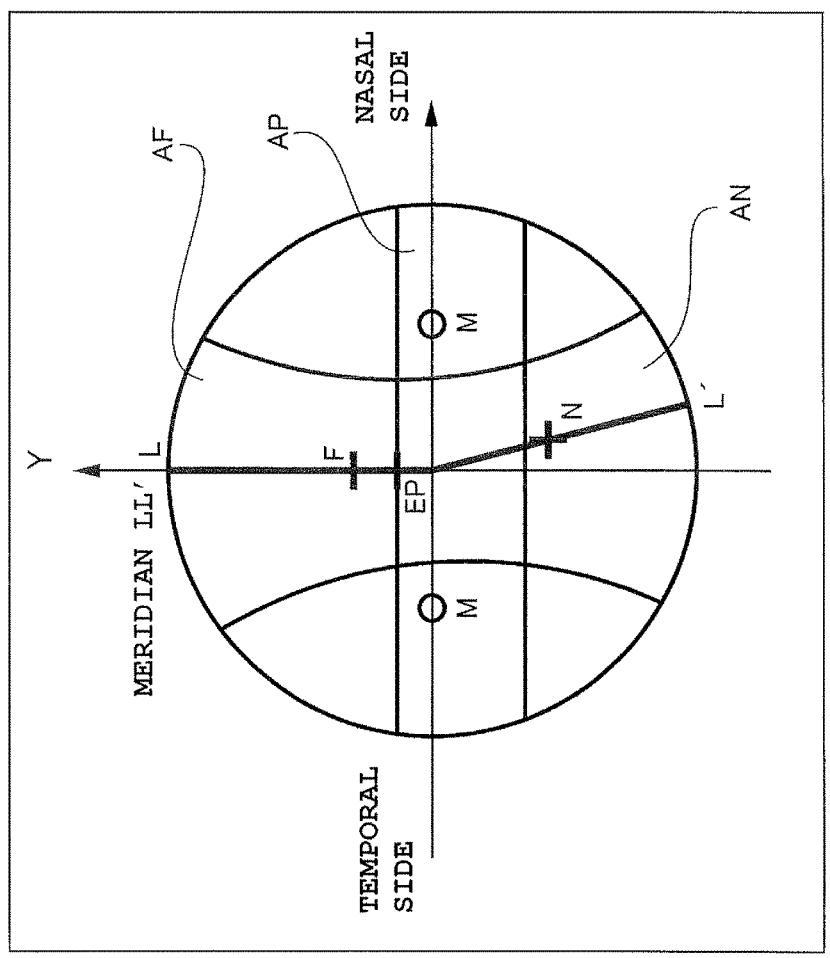
FIG. 3 is a view showing a layout model of a progressive addition lens designed and manufactured according to an embodiment of the present invention.

FIG. 3 shows a layout model of the progressive addition lens designed and manufactured in this embodiment. As shown in FIG. 3, the progressive addition lens has a distance portion AF, a near portion AN, and a progressive portion AP. The distance portion AF is arranged close to an upper side of a lens, and the near portion AN is arranged close to a lower side of a lens. The progressive portion AP is arranged between the distance portion AF and the near portion AN as a power variation portion, as an intermediate corridor in which power is progressively varied from the distance portion AF to the near portion AN. Therefore, a wearer wearing the progressive addition lens can view a wide range of distance away from the hand of a desk work such as a PC or other work.

[S1 in FIG. 2 (Definition of Meridian LL')]

The spectacle lens designing computer 202 sets an eye point EP which is a wearing reference, based on the ordering data (layout data). Note that each point required for the lens layout such as the eye point EP, is specified based on a pair of concealed marks M directly imprinted on a lens surface based on the ordering data (layout data). In an example of FIG. 3, the eye point EP is set in an upper part of a specific distance from a middle point (geometric center of a lens in this example) of a line connecting the pair of concealed marks M.

The spectacle lens designing computer 202 calculates an inset of the near portion AN from the distance portion AF based on a specific parameter in the ordering data received from the display computer 100 through the host computer 200. As the parameter used for calculating the inset, wearing conditions such as BC (base curve), PD (interpupillary distance), inter-vertex distance, pantoscopic angle, frame tilt angle, etc., can be given for example.

The spectacle lens designing computer 202 defines the meridian LL' based on the eye point EP and the inset. As shown in FIG. 3, the meridian LL' is defined as the line extending to the geometric center of the lens from an upper edge of the lens through the eye point EP, and tilted toward a nasal side in consideration of a convergence of an eye toward a lower edge of the lens. Distance reference point F defined by JIS specification which is the point for measuring a distance power, and near reference point N defined by JIS specification which is the point for measuring a near power, are set and arranged on the meridian LL'. The intermediate corridor of the progressive portion AP is set, with the distance reference point F as a base point and the near reference point N as an end point.

[S2 of FIG. 2 (Setting of an Addition Power Distribution on the Meridian LL')]

The spectacle lens designing computer 202 sets the addition power distribution on the meridian LL' based on a specific parameter in the ordering data. Near power, distance power, addition power, and a length of the intermediate corridor of the progressive portion AP, etc., can be given as the parameter used for setting the addition power distribution on the meridian LL'. The addition power distribution is obtained by for example arranging control points at equal intervals in the section on the meridian LL' approximately vertically crossing the progressive portion AP, calculating the power at each control point based on the addition according to the prescription, and interpolating the power between adjacent control points using spline interpolation, etc., such as B spline. However, in such a setting method, the problem that the distance power is added at the eye point EP, cannot be solved.

Therefore, the reason why the distance power is added at the eye point, will be described hereafter.

In the progressive addition lens, power is continuously varied (increased) toward the near reference point from the distance reference point, and the addition is also varied accordingly. At this time, the variation of addition can be reduced by increasing the length of the intermediate corridor on the meridian. When the variation of addition is reduced, astigmatism becomes small, and therefore distortion and sway of the image can be suppressed. However, the length of the intermediate corridor is uniquely determined by the length between the distance reference point and the near reference point set for individual spectacle lens. Therefore, conventionally, the variation of addition power is reduced as much as possible by distributing the addition required for the intermediate corridor, to entire intermediate corridor.

In this case, addition of plus power is started from the distance reference point, in an optical design of the progressive addition lens. Therefore, addition of plus power occurs at the eye point lower than the distance reference point (at the side of the near reference point), other than the distance power obtained by the prescription value at the distance reference point. As a result, addition to the distance power occurs at the eye point.

Originally a human eye does not have a function of adjusting plus power, and therefore when plus power is added at the eye point, the image is blurred in a distance vision. As a specific example, if a calculated visual acuity (decimal visual acuity) is 2.04 in a case of no error of addition, the calculated visual acuity is decreased to 1.63 if the error of addition is 0.12 D, and the calculated visual acuity is decreased to 1.13 if the error of addition is 0.25. Namely, as the plus power added at the eye point becomes larger, the visual acuity in the distance vision becomes lower.

Further, in order to avoid the addition of plus power at the eye point, addition of this portion is required to be distributed to other region of the intermediate corridor, and specifically is required to be distributed to a region lower than the eye point. However, in this case, the addition is varied in a limited narrow region, and therefore the variation rate of an addition power in the intermediate corridor becomes relatively large. As a result, astigmatism of the lens is increased, and the distortion and sway of the image become large.

Generally, as a conventional optical design for the progressive addition lens, a main focus point is that the variation rate of an addition power in the entire intermediate corridor is suppressed to be small as much as possible. Therefore, conventionally, a design technique of starting addition of plus power from the distance reference point is employed, thus having a state that plus power is added to the distance power at the eye point lower than the distance reference point.

Meanwhile, under control of the spectacle lens designing computer 202, the control points are arranged so that the variation rate of an addition power (simply called "power" hereafter) is substantially zero in the circle of radius 4 mm with the distance reference point as a center, and/or in the circle of radius 4 mm with the eye point as a center. Namely, conventionally, power is set to be high at the control points close to the near reference point N, corresponding to the addition. However, in this embodiment, the addition power is set to be substantially zero at all control points in the section from the distance reference point F to the eye point EP on the meridian LL' (namely the variation rate of the addition power in this section is substantially zero). Since there is no addition at the eye point EP, the wearer can clearly view a long distance based on the prescription value, in the case of the distance vision through the eye point EP.

Supplementary description is given as follows. The "variation rate of the addition power is substantially zero" means for example a state that addition (for example transmission mean power) to the addition power (distance power here) as a reference is suppressed to a specific value or less over the entire range of the section. Namely, the "variation rate of the addition power is substantially zero" is not a definition such that a difference between a reference addition power (distance power in this example) and the addition power at a specific point in the section, is suppressed to a specific value or less, but a definition such that the difference between the reference addition power and the addition power at a specific point in the section, is suppressed to a specific value or less (minimum value is zero) over the entire range of the section. Specifically, when the first reference point is set as the distance reference point F, and the second reference point is set as the near reference point N, the maximum addition power difference in the circle of radius 4 mm with the distance reference point F as a center, is suppressed to 0.03 D or less, and further preferably suppressed to 0.01 D or less. Further, the maximum addition power difference in the circle of radius 4 mm with the eye point EP as a center, is suppressed to 0.06 D or less, preferably suppressed to 0.03 D or less, and further preferably 0.01 D or less.

Here, in FIG. 5(b), the minimum addition power in the section from the distance reference point F to the eye point EP on the meridian LL' corresponds to the addition power (0 D) at the distance reference point F. Therefore, the maximum addition power difference in the circle of radius 4 mm with the distance reference point F as a center is expressed by the difference between the maximum addition power and the minimum addition power in this circle (addition power at the distance reference point F). In a usual optical design, the addition power becomes gradually larger toward the eye point EP from the distance reference point F. Therefore, the maximum power difference in the section on the meridian LL' from the point of 12 mm to the eye point EP on the meridian, included in the circle of radius 4 mm with the distance reference point F as a center, is expressed by the difference between the addition power at the eye point EP and the addition power at the distance reference point F. The same thing can be said for the maximum addition power difference in the circle of radius 4 mm with the eye point EP as a center. Namely, the maximum addition power difference in the section from the distance reference point F to the point of a central point on the meridian LL' included in the circle of radius 4 mm with the eye point EP as a center, is expressed by the difference between the maximum addition power and the minimum addition power in the circle (addition power at the distance reference point F), and more specifically is expressed by the difference between the addition power at the point of the central point (geometrical center) which is one end in the circle and the addition power at the distance reference point F which is the other end in the circle.

As described above, by suppressing the variation rate of the addition power to be small, the wearer can view the distance vision without feeling the blurring, etc., of the image even when the visual line is moved between the distance reference point F and the eye point EP. In this point, allowable error of the distance power at the distance reference point is 0.12 D according to JIS standard (standard No. JIST7315), and therefore it can be easily understood that the addition difference can be sufficiently suppressed to be small in comparison with the above case.

Wherein, the user whose spectacle is slipped-up or easily slipped-up in as-worn state, belongs to a minority group in all wearers. Actually, it is empirically known that the spectacle can be worn in a slipped-up state of 2 mm to 3 mm from a wearing point estimated by the optical design of the spectacle lens (namely, in a state that a visual line passes through a point lower than the eye point by 2 mm to 3 mm). In this case, conventionally, the wearer views a distance vision through the point where power is further added than the eye point, thus further making it difficult to clearly view the long distance based on a prescription value. Therefore, in this embodiment, in consideration of this kind of deviation, the variation rate of the addition power is set to be substantially zero in the circle of radius 4 mm with the eye point EP as a center, so that the section on the meridian LL' where the variation rate of the addition power is substantially zero, may be extended to a point lower than the eye point EP by 3 mm for example. Thus, even when the wearer views the distance vision through the lower point of the eye point EP, the long distance based on the prescription value can be clearly viewed.

Not only the wearer whose spectacle slips up or easily slips up in as-worn state, but also all wearers of the spectacle using the progressive addition lens, and all wearers can receive the advantage of the present invention. Particularly, even if the blurring, etc., is generated in the distance vision by addition of the plus power, probably considerable purchasers (elderly people, etc.) who purchase a spectacle with a progressive addition lens, misunderstand the blurring as a reduction of an ocular function of the wearer himself/herself, and use the spectacle as it is. The present invention is capable of solving the blurring, etc., in the distance vision which is caused by addition of the plus power, without allowing the abovementioned misunderstanding of the wearer to occur, thus greatly contributing to reduction of an eyestrain, etc.

Further, the progressive addition lens is not required to secure the distance power at a point in the distance portion away from the distance reference point, in terms of the JIS specification. Therefore, when the wearer moves the visual line upward from the distance reference point, and the plus power is added at this point, the wearer sometimes feels blurring, etc., of the image according to the variation of powers. Therefore, in this embodiment, the section on the meridian LL' where the variation rate of an addition is substantially zero, may be extended to an upper edge of the lens from the distance reference point F for example. Thus, even when the visual line is moved upward from the distance reference point F, the wearer can view the distance vision without feeling the blurring, etc., of the image.

[S3 of FIG. 2 (Control of a Prismatic Effect in a Horizontal Direction)]

The spectacle lens designing computer 202 defines a plurality of sectional curves extending from the meridian LL' in a horizontal direction, and sets a distribution of an addition power on each sectional curve according to a power distribution in each portion of the distance portion AF, the near portion AN, and the progressive portion AP. At this time, when the power distribution is simply set without considering the power distribution difference in each portion, there is a problem that a great distortion occurs in right and left direction. Therefore, the power distribution is set so that the prismatic effect is suppressed (controlled) at a point separated from the meridian by a specific distance (the meridian is a partial line parallel to the Y-axis having a meridian shape in FIG. 3) in a state that the inset is not taken into consideration.

[S4 of FIG. 2 (Temporary Selection of a Lens Surface Shape)]

The spectacle lens designing computer 202 is configured to smoothly connect the power distribution on the meridian LL' and on each sectional curve extending in the horizontal direction, using spline interpolation, etc., and convert the power distribution after connection to a curvature distribution using a publicly-known conversion formula, to thereby temporarily select a geometric shape of a lens surface.

[S5 of FIG. 2 (Ray Trace Calculation)]

The spectacle lens designing computer 202 is also configured to carry out ray trace calculation to the temporarily selected lens in a process of S4 of FIG. 2, and evaluate its optical performance.

[S6 of FIG. 2 (Judgment of Convergence Condition)]

The spectacle lens designing computer 202 is configured to judge whether or not a specific convergence condition is satisfied based on an evaluation result obtained by the process of S5 of FIG. 2. The specific convergence condition is as follows for example: "the variation rate of an addition in the section from the distance reference point F to the eye point EP on the meridian LL' is substantially zero". As other example of the section where the variation rate of an addition is suppressed to substantially zero, for example following cases can be given: "the section from the distance reference point F to the point 3 mm lower than the eye point EP on the meridian LL'", "the section from an upper edge of the lens to the eye point EP on the meridian LL'", and "the section from the upper edge of the lens to the point lower than the eye point EP by 3 mm on the meridian LL'", etc.

When the specific convergence condition is not satisfied, the spectacle lens designing computer 202 returns the processing to S2 of FIG. 2, and adjusts the position, etc., of each control point and thereafter executes the processing after S3 of FIG. 2 again. When the specific convergence condition is satisfied (YES: S6 of FIG. 2), the spectacle lens designing computer 202 calculates and adds an aspherical correction amount based on a wearing condition (for example intervertex distance, pantoscopic angle, and frame tilt angle, etc.) to the shape of the lens surface which is temporarily selected in the process of S4 of FIG. 2. Thus, the shape of the lens surface is determined, and a shape design of the progressive addition lens is completed.

Shape data (lens design data) for determining the progressive addition lens, is transmitted to the spectacle lens processing computer 204. As described above, the spectacle lens processing computer 204 controls to drive the processing device 206 based on the lens design data, and performs processing of the block piece, to thereby manufacture the progressive addition lens. In this processing step, the concealed mark M is also imprinted.

[Comparative Examination]

Next, comparative examination is performed between the progressive addition lens designed by the step shown in the flowchart of FIG. 2 (described as "the present design" hereafter), and a progressive addition lens of conventional design. Note that the conventional design is the design for simply setting power to be higher corresponding to addition, at a control point closer to the near reference point.

Figure 4:
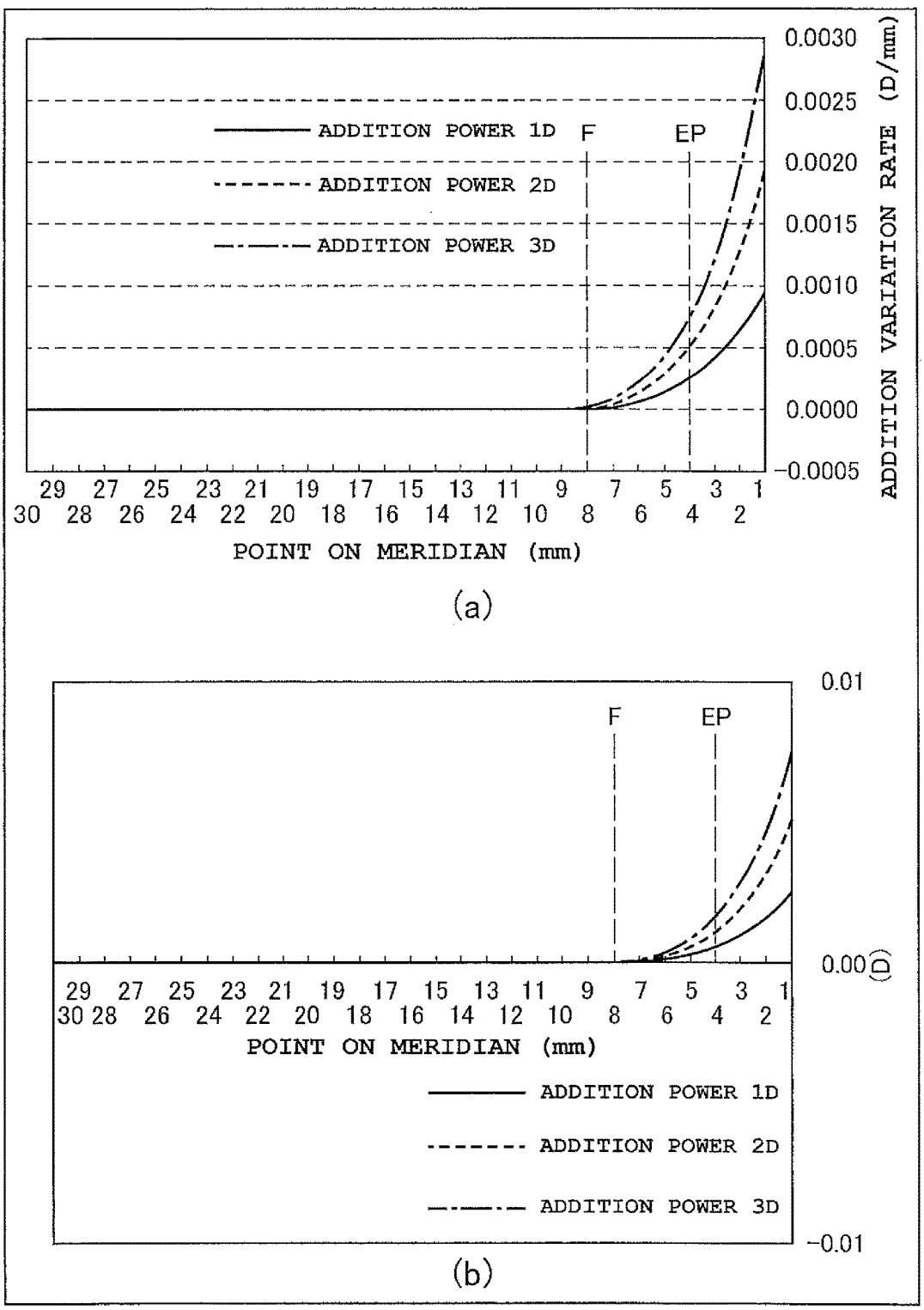
FIG. 4 is a view showing a variation rate of an addition power and a distribution of an addition in a distance section of the progressive addition lens designed in this case.
Figure 5:
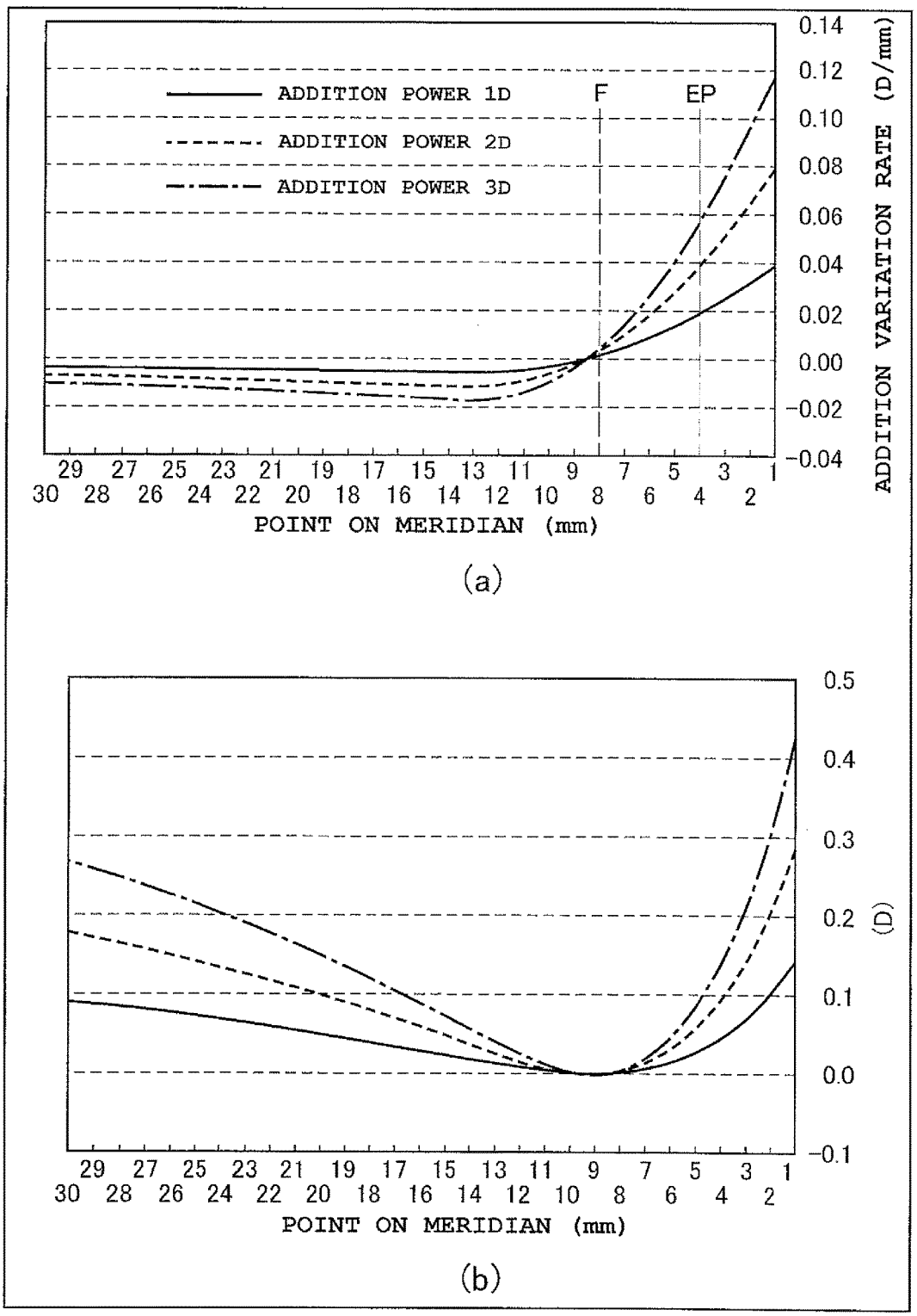
FIG. 5 is a view showing a variation rate of an addition and a distribution of an addition in a distance section of the progressive addition lens based on a conventional design.

FIG. 4(a) shows the variation rate of an addition power (a differential value of the variation of addition) in the section on the meridian LL' of the progressive addition lens of the present design (described as a "distance section" hereafter, which is the section from the upper edge of the lens to the point lower than the eye point EP by 3 mm), and FIG. 4(b) shows an addition power distribution in the distance section of the progressive addition lens of the present design. Also, FIG. 5(a) shows the variation rate of the addition power in the distance section of the progressive addition lens of conventional design, and FIG. 5(b) shows the addition distribution in the distance section of the progressive addition lens of the conventional design. The horizontal axis of FIG. 4 and FIG. 5 indicates the point (unit: mm) on the meridian, and the vertical axis of FIG. 4(a) and FIG. 5(a) indicates the variation rate of an addition power (unit: D/mm), and the vertical axis of FIG. 4(b) and FIG. 5(b) indicates power (unit: D) with power at the distance reference point as a reference (0 D). Also, in the figure, solid line indicates a design example that addition is 1.0 D, broken line indicates a design example that addition is 2.0 D, and one dot chain line indicates a design example that addition is 3.0 D. The vertical axis of FIG. 4 and the vertical axis of FIG. 5 are shown by different scales for the convenience.

In the conventional design shown in FIG. 5, for example the variation rate of an addition power is large (see FIG. 5(a)), and the power is progressively varied corresponding to the addition, in the section from the distance reference point to the eye point (see FIG. 5(b)). As shown in FIG. 5(b), in the conventional design, addition at the eye point is as follows: about 0.05 D when addition power is 1.0 D; about 0.10 D when addition power is 2.0 D, and about 0.15 D when addition power is 3.0 D. Also, addition at the point lower than the eye point by 3 mm is as follows: 0.14 D when addition power is 1.0 D; 0.28 D when addition power is 2.0 D, and 0.42 D when addition power is 3.0 D. Therefore, there is a problem that the long distance based on the prescription value cannot be clearly viewed when viewing through the eye point and near the eye point. Particularly, at the point lower than the eye point by 3 mm, addition is larger than error 0.12 D allowable by JIS standard (standard No. JIS T7315), and therefore it is further difficult to clearly view the long distance based on the prescription value.

Meanwhile, in the present design shown in FIG. 4, the variation rate of an addition power is substantially zero in the section from the point of 12 mm to the eye point EP on the meridian included in the circle of radius 4 mm with the distance reference point F as a center (see FIG. 4(a)), and the addition power is substantially not changed (see FIG. 4(b)). As shown in FIG. 4(b), in the present design, the variation rate of an addition power is also substantially zero in the section from the distance reference point F to a middle point included in the circle of radius 4 mm with the eye point EP as a center. Therefore, the wearer can clearly view the long distance based on the prescription value when viewing through the eye point and near the eye point.

Subsequently, other embodiment of the present invention will be described using FIG. 6. Note that in the explanation hereafter, the abovementioned embodiment is defined as a first embodiment, and an embodiment described hereafter is defined as a second embodiment, for the convenience of explanation.

Figure 6:
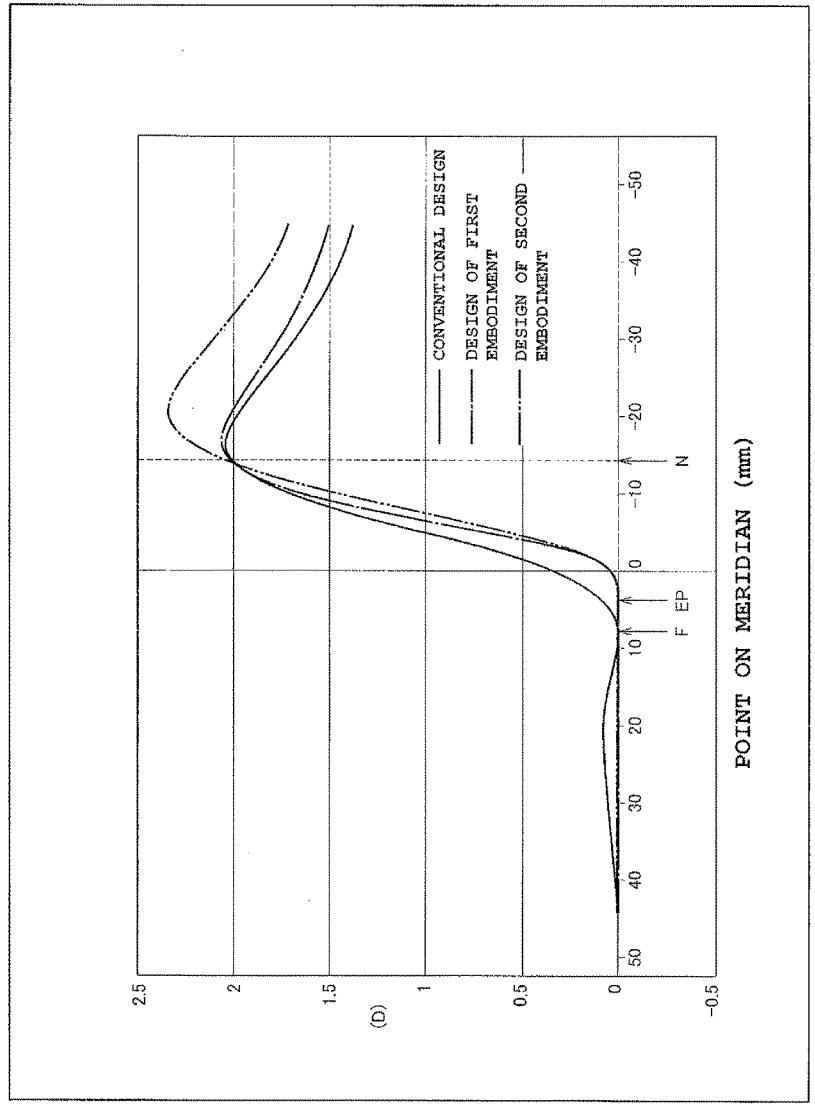
FIG. 6 is a view showing an addition curve showing a variation of an addition on a meridian.

FIG. 6 is a view showing an addition curve of a variation of addition on the meridian. In FIG. 6, the addition curve of the progressive addition lens based on a conventional optical design is indicated by solid line, the addition curve of the progressive addition lens based on an optical design of the first embodiment is indicated by one dot chain line, and the addition curve of the progressive addition lens based on an optical design of the second embodiment is indicated by two dots chain line. Further, the vertical axis indicates the addition power of the lens, and the horizontal axis indicates the point on the meridian. A central (zero) point on the horizontal axis is a middle point of a line connecting a pair of marks M (see FIG. 3), and a point deviated from the middle point by 4 mm to a left side (plus value side: upper side in as-worn state), is the eye point EP. Also, a point deviated from the middle point by 8 mm to a left side is the distance reference point F (corresponding to the first reference point), and a point deviated from the middle point by 14 mm to a right side (minus value side) is the near reference point N (second reference point). Also, FIG. 6 shows a case that the addition of the progressive addition lens is 2.00 D (when near power=2.00 D, and distance power=0.00 D). The addition power of the progressive addition lens is expressed by a difference between the distance power at the distance reference point and the near power at the near reference point.

First, when the addition curve (called an addition curve hereafter) of the spectacle lens based on the conventional optical design is observed, it is found that addition of plus power is started with the distance reference point F as a start point, and plus power of about 0.30 D is added to the distance power at the eye point EP. In this case, if the prescription value of the addition power at the distance reference point F is 0.00 D, addition just as prescribed is added at the distance reference point F, but the addition at the eye point EP has an error of +0.30 D from the prescription value. Such an error of the addition is larger than error 0.12 D which is allowable in JIS standard (standard No. JIST7315).

Meanwhile, when the addition curve of the spectacle lens based on the optical design of the first embodiment is observed, it is found that almost no plus power is added in the section from the distance reference point F to the eye point EP on the meridian. However, the addition curve rises rapidly toward the near reference point N from the eye point EP (particularly the middle point). Therefore, the inclination of the addition curve is larger than the addition curve of the spectacle lens based on the conventional optical design.

Meanwhile, when the addition curve of the spectacle lens based on the optical design of the second embodiment is observed, almost no plus power is added in the section from the distance reference point F to the eye point EP on the meridian. This point is the same as the case of the first embodiment. However, when comparing the second embodiment and the first embodiment, the addition curve is a low-gradient rise toward the near reference point N from the eye point EP (particularly the middle point). This is because the spectacle lens of the second embodiment has the following structure.

First, in the spectacle lens based on the optical design of the second embodiment, the maximum addition (maximum value) point (called a "peak point" hereafter) of the addition curve on the meridian exists at a point largely deviated to the right side of the near reference point N (opposite side of the eye point EP), compared with the conventional case and the case of the first embodiment. Specifically, the peak point of the addition curve of the spectacle lens based on the conventional optical design is deviated by about 2 mm to the right side from the near reference point N, and the peak point of the addition curve of the spectacle lens based on the optical design of the first embodiment is deviated by about 3 mm to the right side from the near reference point N. Such a degree of deviation inevitably occurs although it is not particularly intended, when the addition at the distance reference point F and the addition at the near reference point N are set just as prescribed respectively, and when the optical design is intended to smoothly connect the addition curve on the meridian as much as possible. The reason is as follows.

(1) When the addition curve on the meridian is formed to be smooth as much as possible, the shape of the addition curve near the peak point is required to be the shape close to a parabola (mountain shape).

(2) When the addition at the near reference point N is set to be the addition just as prescribed, the addition is required to coincide with the prescription value at this side (left side) of the peak point.

For the reason described above, the peak point is necessarily deviated to the right side of the near reference point N.

When the addition of the spectacle lens varies at a constant level while maintaining the maximum addition at the right side of the near reference point N, the point where the addition reaches the maximum power first, is set as the peak point.

Meanwhile, the peak point of the addition curve of the spectacle lens based on the optical design of the second embodiment is deviated by about 7 mm to the right side from the near reference point N. It cannot be said any more that such a degree of deviation inevitably occurs. In other words, such a degree of deviation does not occur unless intentionally set the peak point of the addition curve to be deviated from the near reference point N. Whether or not such a deviation is an inevitable deviation or an intentional deviation, can be judged from an actual deviation amount. Specifically, if the peak point of the addition curve is deviated by at least 5 mm or more to the right side from the near reference point N, it can be so judged that such a deviation is not the inevitable deviation due to the conventional optical design, etc., but the intentional deviation. This is because even if the prescription value of the addition at the near reference point N is beyond 2.00 D when the addition at the distance reference point F is zero, there is almost no change in the curve shape (curving state) near the peak point, although the inclination of the addition curve is slightly large in this section.

Further, when the second embodiment is compared with the first embodiment in terms of the maximum addition, the maximum addition is larger in the case of the second embodiment than in the conventional case and in the case of the first embodiment. Specifically, the maximum addition in the addition curve of the spectacle lens based on the conventional optical design and the optical design of the first embodiment, is about 2.10 D respectively. Meanwhile, the maximum addition in the addition curve of the spectacle lens based on the optical design of the second embodiment is about 2.35 D. In the structure of the spectacle lens of the second embodiment, the maximum addition on the addition curve may be 1.10 times or more of the addition at the near reference point. In an example shown in FIG. 6, the addition at the near reference point is 2.00 D. However, if the addition is defined by a relative comparison with the addition of 2.00 D, the maximum addition may be 2.31 D or more. In the example shown in the figure, the maximum addition in each case of the conventional embodiment and the first embodiment, is about 1.05 times of the addition at the near reference point, and meanwhile the maximum addition in the case of the second embodiment is about 1.17 times of the addition at the near reference point.

Further, when a region in which the astigmatism is 0.5 D or less is defined as a clear vision region, preferably a clear vision region has a wide side as much as possible. In a simulation of the optical design by inventors of the present application, the width of the clear vision region in a range of 4 to 6 mm lower than the geometric center of the spectacle lens (where the width of the clear vision region is narrow), is the same as the width of the spectacle lens based on the conventional optical design. Therefore, the maximum addition is preferably set to 1.15 times or more of the addition at the near reference point. This is because if the width of the clear vision region becomes narrow, there is a problem that the distortion and sway of the image are increased by increase of astigmatism, and in order to avoid such an inconvenience, it is effective to set the maximum addition under the abovementioned condition.

Figure 7:
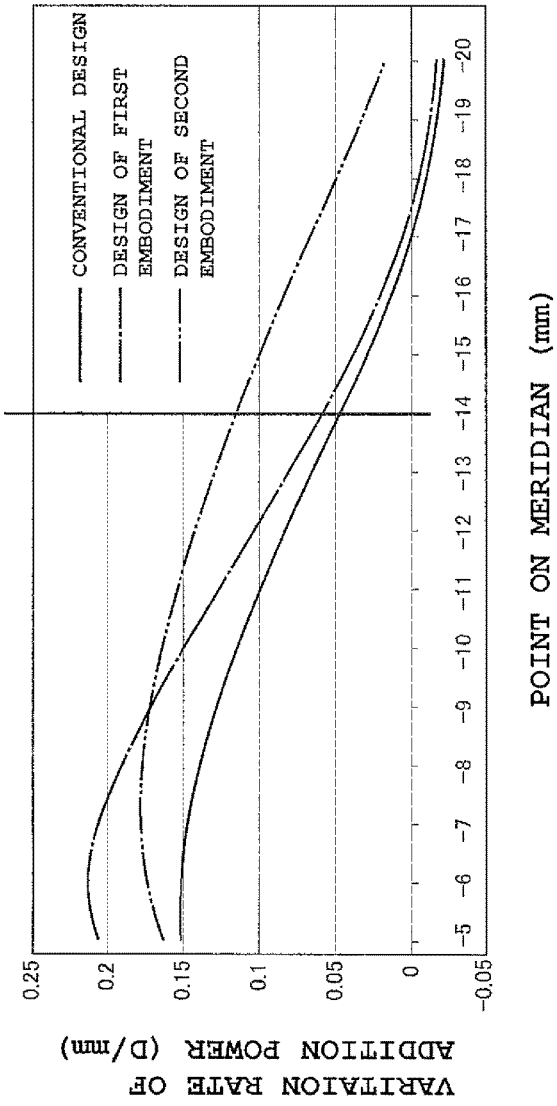
FIG. 7 is a view showing a curve of a variation rate of an addition when the addition is 2 D.

Further, FIG. 7 shows the curve of the variation rate of an addition power when the addition power is 2 D, wherein when a large/small relation of the variation rate of an addition power at the near reference point N is compared, the variation rate of an addition power in the case of the second embodiment is larger than the variation rate of an addition power in the conventional case and in the case of the first embodiment. Specifically, a simulation result of the variation rate of an addition power at the near reference point N when the addition is 2 D, shows as follows: 0.045 (D/mm) in the conventional case, 0.057 (D/mm) in the case of the first embodiment, and meanwhile 0.113 (D/mm) in the case of the second embodiment which is larger than the conventional case and the case of the first embodiment. Also, a simulation result of the variation rate of an addition power at the near reference point N when the addition is 1 D shows as follows: 0.022 (D/mm) in the conventional case, 0.028 (D/mm) in the case of the first embodiment, and meanwhile 0.056 (D/mm) in the case of the second embodiment which is larger than the conventional case and the case of the first embodiment. Also, a simulation result of the variation rate of an addition power at the near reference point N when the addition power is 3 D shows as follows: 0.067 (D/mm) in the conventional case, 0.086 (D/mm) in the case of the first embodiment, and meanwhile 0.170 (D/mm) in the case of the second embodiment which is larger than the conventional case and the case of the first embodiment.

According to the second embodiment, even when the variation rate of an addition power is suppressed to substantially zero from the distance reference point F to near the eye point EP, the addition curve is a low-gradient curve in the region from the eye point EP to the near reference point N compared with at least the first embodiment, by intentionally setting high maximum addition of the addition curve and intentionally setting the peak point to be largely deviated from the near reference point N. Thus, the width of the clear vision region can be increased, and the distortion and sway, etc., of the image due to increase of the astigmatism can be suppressed to be small in the intermediate corridor.

Further, when the addition is set to coincide with the prescription value at the near reference point N, and thereafter for example the maximum addition is increased in the increase of 15% of the prescription value, plus power is added in a region lower than the near reference point N. Thus, in a certain use environment, addition of plus power from the near reference point N to the lower region is advantageous in some cases.

Specifically, this is the case for example when a cellular phone (including a smart phone) is operated on a crowded train while viewing a screen. In such a use environment, the screen of the cellular phone is extremely approached to a face to view the screen in many cases, in consideration of neighboring passengers. In this case, the user views the screen using "the region lower than the near reference point N" which is hardly used in a usual lifestyle. Accordingly, if the plus power is added in this region when viewing the screen using this region, a nearby object is easily focused, and therefore an advantage of easily viewing the screen can be obtained.

As a result, double effects of improving a visual performance when viewing an object using the intermediate corridor, and improving a visual performance when viewing an object using the region lower than the near reference point N, can be simultaneously obtained.

Exemplary embodiments of the present invention are described above. However, the embodiment of the present invention is not limited thereto, and can be variously modified in a range of a technical concept of the present invention. For example, examples given as examples, etc., in this specification or obvious examples, etc., can be suitably combined and can be included in the embodiment of the present application.

Further, in the second embodiment, explanation is given for the difference from the spectacle lens of the first embodiment. However, in a specific application, the second embodiment can be applied to not only the spectacle lens of the first embodiment, but also the progressive addition lenses in general. In this case, preferable supplementary descriptions are described as follows.

(Supplementary Description 1)

There is provided a spectacle lens, including specific first and second reference points, and eye point between the first and second reference points on a meridian, with each point defined on a meridian based on a specific concealed mark; and a power variation portion where power is continuously varied from the first reference point to the second reference point, wherein the maximum addition point on an addition curve showing a variation of addition on the meridian, is set at a position deviated by at least 5 mm or more from the second reference point to an opposite side of the eye point, and the maximum addition is set to at least 1.10 times of an addition at the second reference point, to thereby obtain a low-gradient inclination of the addition curve from the eye point to the second reference point.

(Supplementary Description 2)

There is provided a method for manufacturing a spectacle lens including specific first and second reference points; and an eye point between the first and second reference points so as to be defined on a meridian based on a specific concealed mark; and a power variation portion where a power is continuously varied from the first reference point to the second reference point, wherein a maximum addition point on an addition curve showing a variation of an addition on the meridian, is set at a position deviated by at least 5 mm or more from the second reference point to an opposite side of the eye point, the method including: processing at least one side of the spectacle lens so that the maximum addition is at least 1.10 times or more of the addition at the second reference point.

DESCRIPTION OF SIGNS AND NUMERALS

1 Spectacle lens manufacturing system
10 Spectacle shop
20 Spectacle lens manufacturing plant
100 Display computer
200 Host computer
202 Spectacle lens designing computer
204 Spectacle lens processing computer
206 Processing device

The invention claimed is:

1. A spectacle lens, comprising:
specific first and second reference points, and eye point between the first and second reference points, with each point defined on a primary meridian; and
a power variation portion where a power is continuously varied from the first reference point to the second reference point,
wherein the spectacle lens is configured to satisfy a distance power at the first reference point based on specific prescription information, and satisfy a near power at the second reference point based on the prescription information,
the eye point is a point for distance vision, and the spectacle lens is a progressive addition lens in which a power is progressively varied in the power variation portion,
a maximum addition power difference is 0.03 D or less in a circle of radius 4 mm with the first reference point as a center, and/or a maximum addition power difference is 0.06 D or less in a circle of radius 4 mm with the eye point as a center,
a maximum addition point on the primary meridian is a point deviated to an opposite side of the eye point from the second reference point, and
a maximum addition is higher than an addition at the second reference point.

2. The spectacle lens according to claim 1, wherein a maximum addition power difference is also 0.03 D or less in a section on the primary meridian from the first reference point to an edge of the spectacle lens at an opposite side of the eye point.

3. The spectacle lens according to claim 1, wherein a deviation amount between the maximum addition point and the second reference point on the main meridian is 3 mm or more, and the maximum addition is 1.10 times or more than the addition at the second reference point.

4. The spectacle lens according to claim 1, wherein when a region of astigmatism of 0.5 D or less is set as a clear vision region, a point where a variation rate of an addition power is maximum on the primary meridian is set at a point closer to the second reference point than a range where a width of the clear vision region is small.

5. The spectacle lens according to claim 1, wherein the maximum addition point on an addition curve showing a variation of addition power on the main meridian, is set at a position deviated by 5 mm or more from the second reference point to an opposite side of the eye point, and the maximum addition is set to at least 1.10 times of the addition at the second reference point.

6. The spectacle lens according to claim 1, wherein the first reference point is a distance reference point, and the second reference point is a near reference point.

7. A method for designing a spectacle lens comprising specific first and second reference points; eye point between the first and second reference points, with each point defined on a primary meridian; and a power variation portion where a power is continuously varied from the first reference point to the second reference point, wherein the spectacle lens is configured to satisfy a distance power at the first reference point based on specific prescription information, and satisfy a near power at the second reference point based on the prescription information,
the method comprising:
setting a maximum addition power difference in a circle of radius 4 mm with the first reference point as a center to be 0.03 D or less, and/or a maximum addition power difference in a circle of radius 4 mm with the eye point as a center to be 0.06 D or less, and
setting a maximum addition point on the primary meridian to be a point deviated to an opposite side of the eye point from the second reference point, and a maximum addition to be higher than an addition at the second reference point.

8. The method for designing spectacle lens according to claim 7, comprising setting a power distribution on the primary meridian so that a maximum addition power difference is also 0.03 D or less in a section on a primary meridian from the first reference point to an edge of the spectacle lens at an opposite side of the eye point.

9. The method for designing spectacle lens according to claim 7, wherein a power distribution of the power variation portion is set by arranging a plurality of control points on the primary meridian, calculating a power at each control point based on a power difference between the first and second reference points, and interpolating the power between adjacent control points using an interpolation function, and all of addition powers between the adjacent control points are set to be 0.06 D or less.

10. A method for manufacturing a spectacle lens, comprising a step of manufacturing a spectacle lens designed using the method of claim 7.

11. A system for manufacturing a spectacle lens, the spectacle lens comprising:
specific first and second reference points, and eye point between the first and second reference points, with each point defined on a primary meridian; and
a power variation portion where a power is continuously varied from the first reference point to the second reference point,
wherein the spectacle lens is configured to satisfy a distance power at the first reference point based on specific prescription information, and satisfy a near power at the second reference point based on the prescription information,
a maximum addition power difference is 0.03 D or less in a circle of radius 4 mm with the first reference point as a center, and/or a maximum addition power difference is 0.06 D or less in a circle of radius 4 mm with the eye point as a center,
a maximum addition point on the primary meridian is a point deviated to an opposite side of the eye point from the second reference point, and
a maximum addition is higher than an addition at the second reference point, and
the system comprising:
an ordering side terminal configured to transmit specific prescription information as ordering data;

a design side terminal configured to receive the ordering data and design a spectacle lens suitable for a prescription; and a processing device configured to polish a spectacle lens surface according to a design at the design side terminal, wherein the design side terminal is configured to set a power distribution of the power variation portion so that the maximum addition power difference is 0.03 D or less in the circle of radius 4 mm with the first reference point as a center, and/or the maximum addition power difference is 0.06 D or less in the circle of radius 4 mm with the eye point as a center.

12. A spectacle lens, comprising:

specific first and second reference points, and eye point between the first and second reference points, with each point defined on a primary meridian; and a power variation portion where a power is continuously varied from the first reference point to the second reference point, wherein the spectacle lens is configured to satisfy a distance power at the first reference point based on specific prescription information, and satisfy a near power at the second reference point based on the prescription information, a maximum addition power difference is 0.03 D or less in a circle of radius 4 mm with the first reference point as a center, and/or a maximum addition power difference is 0.06 D or less in a circle of radius 4 mm with the eye point as a center, a maximum addition point on the primary meridian is a point deviated to an opposite side of the eye point from the second reference point, and a maximum addition is higher than an addition at the second reference point.

* * * * *